United States Patent [19]

Harris

[11] Patent Number: 4,893,533

[45] Date of Patent: Jan. 16, 1990

[54] BAND SAW HAVING MORE THAN TWO BLADE GUIDES

[76] Inventor: Gerald R. Harris, P.O. Box 1148, Pryor, Okla. 74362

[21] Appl. No.: 194,484

[22] Filed: May 16, 1988

[51] Int. Cl.⁴ .............................................. B23D 55/08
[52] U.S. Cl. ........................................ 83/13; 83/56; 83/168; 83/169; 83/455; 83/796; 83/820
[58] Field of Search ................. 83/13, 56, 168, 169, 83/277, 409, 409.1, 788, 796, 797-801, 820, 454, 455, 803, 804

[56] References Cited

U.S. PATENT DOCUMENTS

| | | | |
|---|---|---|---|
| 2,908,303 | 10/1959 | Schmidt, Jr. | 83/820 X |
| 3,352,186 | 11/1967 | Cleland | 83/796 X |
| 3,485,123 | 12/1969 | Komendowski | 83/168 |
| 3,789,717 | 2/1974 | Stolzer | 83/796 |
| 3,848,493 | 11/1974 | Harris | 83/168 |
| 4,558,614 | 12/1985 | Harris | 83/56 |

Primary Examiner—Frank T. Yost
Assistant Examiner—Eugenia A. Jones
Attorney, Agent, or Firm—Flehr, Hohbach, Test, Albritton & Herbert

[57] ABSTRACT

Band saw apparatus for cutting multiple workpieces simultaneously having more than two blade guide assemblies formed for sliding engagement with a continuous loop saw blade to define at least two saw blade cutting stretches. A vise assembly is also provided to separate multiple workpieces in at least two spaced workpiece retaining channels generally aligned with the saw blade cutting stretches. The band saw apparatus is particularly suitable for cutting multiple workpieces having a relatively small diameter. An improved method for cutting multiple workpieces simultaneously is also provided.

23 Claims, 3 Drawing Sheets

BAND SAW HAVING MORE THAN TWO BLADE GUIDES

TECHNICAL FIELD

The present invention relates generally to band saw apparatus which utilize a rotating continuous loop saw blade for cutting multiple workpieces simultaneously and, more particularly, to band saw apparatus having multiple aligned blade guide members, each blade guide member formed for sliding engagement with the saw blade to guide and orient a portion of the saw blade for cutting at least one workpiece. The present invention also provides an improved method for cutting multiple workpieces simultaneously.

BACKGROUND ART

Various uses for continuous loop band saws have evolved in industry, and numerous band saw apparatus have been developed. Band saw apparatus typically comprise a frame with a pair of aligned wheels rotatably mounted to the frame in spaced apart relationship. A continuous loop saw blade is mounted on the wheels and rotated thereby, and two blade guide assemblies are typically mounted to the frame intermediate the wheels. The blade guide assemblies slidingly engage the saw blade to orient it in a generally upright cutting position defining a saw blade cutting stretch intermediate the saw blade guide members. The saw blade and the workpieces are displaced relative to one another so that the saw blade contacts and cuts the workpieces at the saw blade cutting stretch.

The primary goals of band saw apparatus are generally to provide consistently accurate cuts in as many workpieces per unit time as possible, without causing excessive stress on the band saw blade or the saw blade drive means. Common problems with prior art band saw apparatus include deviation of the saw blade and misalignment of the frame during cutting, which result in non-uniform cutting of workpieces and increased saw blade stress and wear. Saw blade fatigue results from bending the continuous loop saw blade around the rotating wheels and from orienting the saw blade in a cutting position along saw blade cutting stretches (usually by twisting the blade by 90. between the drive and idler wheels), and it is therefore desirable to cut as many workpieces as possible per saw blade revolution.

Since the portion of the cycle time devoted to aligning workpieces in a cutting position and clearing cut workpieces from the cutting position remains constant regardless of the number of workpieces being cut, efforts have been directed to cutting multiple workpieces simultaneously to improve cutting efficiency and reduce saw blade stress and wear. The common problems are exaggerated when multiple workpieces having a relatively small cross-sectional surface area are aligned and cut simultaneously in an attempt to improve cutting efficiency. In general, saw blade deflection increases as a function of the third power of the length of the saw blade cutting stretch and the distance between saw blade guide members increases. For this reason, it is desirable to provide a relatively short saw blade cutting stretch.

One approach which has been taken to attempt to increase band saw cycling efficiency when cutting small diameter workpieces, such as dowels, bars and the like, has been to bundle or group multiple workpieces together for simultaneous cutting. Multiple workpieces having relatively small diameters, when bundled together, however, easily become misaligned during cutting at a single saw blade cutting stretch, and complex vise assemblies may be required to position and hold the workpieces during cutting. Moreover, since the saw blade must pass through several side-by-side bars without clearing of metal chips from the gullets of the blade, the blade speed must be lowered to approximately the same speed as if a single large diameter workpiece was being cut. Still further as the bundle size increases, the blade guides must be separated, and blade deflection as a result of separation rapidly increases.

One approach to the problem of saw blade deflection between the saw guide assemblies is shown in U.S. Pat. No. 3,789,717. This patent teaches a band saw apparatus having three blade guide members spaced apart from one another defining a single saw blade cutting stretch between the outer blade guide members. The intermediate blade guide member is centrally positioned between the outer blade guide members and is freely movable away from the blade in a direction substantially parallel to the plane of the saw blade cutting stretch. The intermediate blade guide member contacts the saw blade to provide additional support prior to cutting and during entry of the saw blade into the workpiece. The central guide assembly is lifted away as the saw blade enters the workpiece. The band saw apparatus taught by the '717 patent provides a single saw blade cutting stretch between the outer blade guide members, and it does not overcome the deficiencies of prior art band saw apparatus pointed out above with respect to cutting a plurality of aligned workpieces simultaneously once the blade has entered the bundle of workpieces.

Accordingly, it is an object of the present invention to provide a band saw apparatus and method for accurately and uniformly cutting multiple workpieces simultaneously.

It is another object of the present invention to provide a band saw apparatus providing enhanced band saw cutting efficiency.

It is yet another object of the present invention to provide a band saw apparatus for cutting multiple workpieces simultaneously at each of a plurality of band saw cutting stretches.

It is still another object of the present invention to provide an improved method for aligning and cutting multiple workpieces simultaneously with a band saw apparatus.

A further object of the present invention is to provide a band saw suitable for simultaneous cutting of multiple workpieces with minimum blade fatigue.

Another object of the present invention is to provide a band saw guide assembly for guiding the band saw blade which is durable, can be retrofit to existing saws, requires minimum maintenance and is inexpensive to construct.

DISCLOSURE OF THE INVENTION

The band saw apparatus of the present invention comprises a support means, a frame mounted to the support means, a pair of spaced, aligned wheels rotatably mounted to the frame, a continuous loop band saw blade mounted on the spaced wheels and rotatable thereby, and multiple saw blade guide means formed for sliding engagement with the saw blade, including at least three blade guide means mounted to the frame intermediate the spaced wheels in spaced apart relation to define at least two saw blade cutting stretches. According to a preferred embodiment of the band saw apparatus of the present invention, a vise assembly having at least three workpiece positioning and retaining means is provided to align multiple workpieces in at least two spaced workpiece retaining channels generally aligned with the saw blade cutting stretches. The band saw apparatus is capable of simultaneously cutting multiple workpieces at multiple cutting stretches of a single saw blade to reduce saw blade deviation and fatigue during cutting, and to provide enhanced cutting efficiency. The productivity of the band saw apparatus of the present invention approaches that of two or more conventional band saws, in that it is capable of cutting multiple workpieces simultaneously at nearly the maximum efficient cutting rate at multiple saw blade cutting stretches.

The present invention also provides an improved method for aligning and cutting multiple workpieces simultaneously at a plurality of spaced saw blade cutting stretches.

BRIEF DESCRIPTION OF THE DRAWINGS

Further features of the invention will be apparent from the following more detailed description read in conjunction with the drawings, in which.

BEST MODE OF CARRYING OUT THE INVENTION

Figure 1:
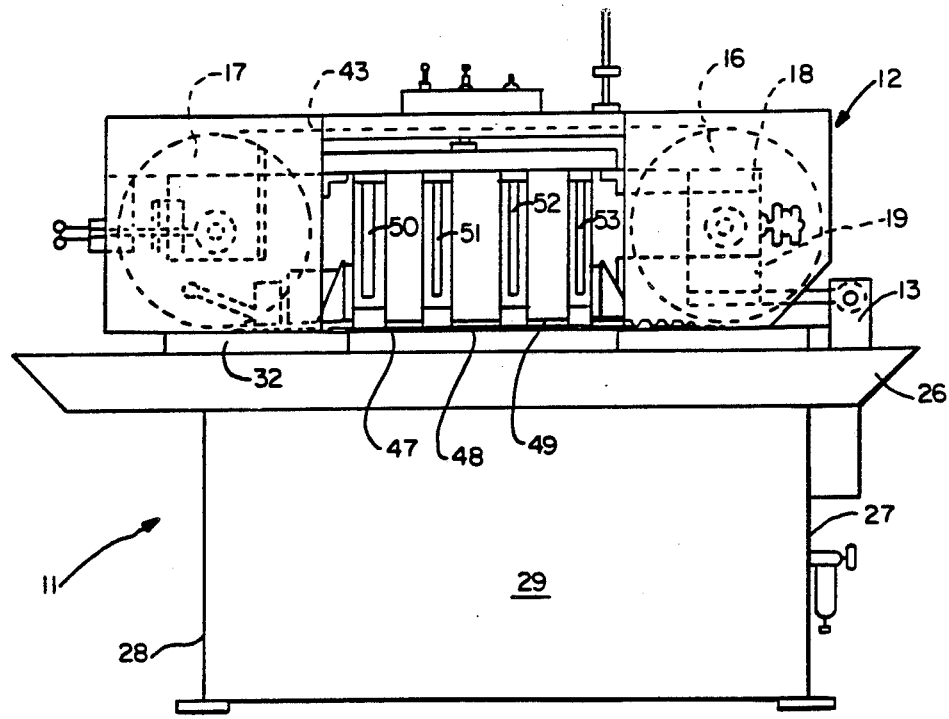
FIG. 1 shows a side elevational view of a band saw apparatus of the present invention having multiple blade guide members.
Figure 2:
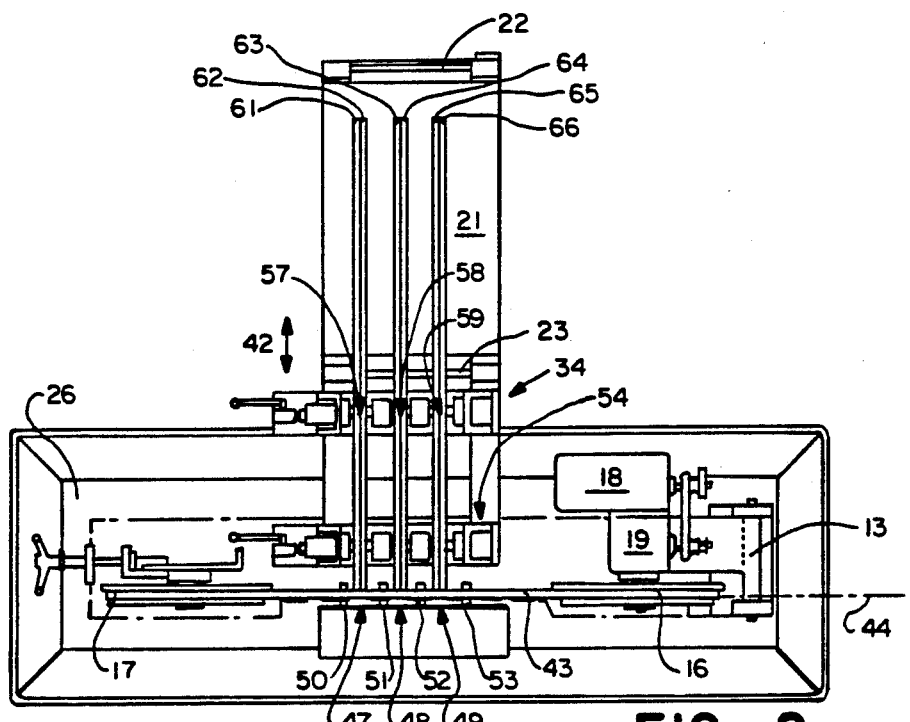
FIG. 2 shows a top plan view of the band saw apparatus of FIG. 1.

FIGS. 1 and 2 illustrate the basic components of the band saw apparatus of the present invention. The band saw comprises a support, generally designated frame 11, to which an arm, generally designated 12, is pivotally secured by pivotal mounting means 13. Pivotal arm band saws are known to the art, and suitable pivotal mounting means are described in detail in U.S. Pat. No. 3,848,493. The disclosure of U.S. Pat. No. 3,848,493 is incorporated herein by reference in its entirety. Although the band saw apparatus of the present invention having multiple blade guide members is illustrated and described below with reference to a pivotal arm band saw, it will be appreciated that the present invention is not limited to pivotal arm band saw apparatus, but is applicable to many types of horizontal and vertical band saws having blade guide members for orienting the saw blade in a cutting position.

In the band saw apparatus illustrated in FIG. 1, wheels 16 and 17 are aligned and rotatably mounted to arm 12. One of the wheels, designated here as drive wheel 16, is operatively connected to motor 18 through power drive speed reducer 19. Continuous loop saw blade 43 is mounted on drive wheel 16 and idler wheel 17 and is rotatable in a continuous loop thereby. Wheels 16 and 17 and saw blade 43 are all disposed substantially along cutting plane 44, the cutting plane of saw blade 43 through workpieces. While cutting plane 44 is illustrated as being substantially vertical, it will be recognized that it need not be vertical. It is also possible to mount wheels 16 and 17 at an angle to plane 44 while still twisting blade 43 to cut along plane 44, so that the plane of rotation of the wheels and the cutting plane of saw blade 43 need not coincide.

Support frame 11 includes feed table 21 having work supporting roller assemblies 22 and 23 and at least one vise assembly 34. Support frame 11 further includes supporting legs 27 and 28 and front panel 29, as well as workpiece chip and coolant receiving tray 26. Vise assembly 34 is preferably mounted on top of bench 32 over the coolant and chip receiving tray.

Saw blade guide assemblies 50, 51, 52 and 53 are carried by band saw arm 12 intermediate drive wheel 16 and idler wheel 17 and are aligned substantially along cutting plane 44. Each of the blade guide assemblies is formed for sliding engagement with the continuous loop saw blade to guide and orient (twist) the saw blade to a generally upright cutting position. Suitable saw blade guide assemblies provided with means for sliding engagement with continuous loop saw blade 43 are known to the art and are described, for example, in U.S. Pat. Nos. 3,848,493 and 4,558,614.

Provision of more than two spaced saw blade guide assemblies defining multiple saw blade cutting stretches is an important feature of the band saw apparatus of the present invention. Saw blade guide assemblies 50, 51, 52 and 53 are spaced apart from one another and orient continuous loop saw blade 43 to form a plurality of saw blade cutting stretches 47, 48 and 49. Although the band saw apparatus of the present invention is illustrated showing four saw blade guide assemblies defining three saw blade cutting stretches, it is readily apparent that the apparatus of the present invention is not limited to this embodiment. It is important that the band saw apparatus have at least three saw blade guide assemblies defining at least two saw blade cutting stretches, and additional blade guide assemblies defining additional cutting stretches may be provided as may be conveniently accommodated by the band saw apparatus.

One or more of the saw blade guide assemblies may be laterally adjustable to permit adjustment of the length of each of the saw blade cutting stretches. Suitable lateral adjustment means are well known to the art. The length of cutting stretches 47–49 and the positioning of saw blade guide assemblies 50–53 depends, to a large extent, upon the dimension and number of the workpieces being cut. Saw blade stiffness at the cutting stretches is largely determined by the spacing of guide assemblies 50–53 and the length of cutting stretches 47–49, and workpieces having different compositions and different dimensions may require different degrees of saw blade stiffness to provide accurate, uniform cuts.

The band saw apparatus of the present invention is particularly suitable for cutting multiple workpieces 61–66 having a relatively small cross-sectional surface area. Although workpieces 61–66 are illustrated as having a circular cross-section, the saw blade apparatus and cutting method of the present invention is equally suitable for cutting workpieces having rectangular, triangular, oblong, and other regular or irregular cross-sections. Similarly, although the present invention is especially suitable for use with workpieces having a relatively small cross-section, it is not limited to use with these types of workpieces. Workpieces 61–66 are positioned on feed table 21, and are advanced on work supporting roller assemblies 22 and 23. Vise assemblies 34 and 54 are provided for aligning and clamping the workpieces in a cutting position.

Since the band saw of the present invention is particularly efficient and well suited for production cutting, it is preferred that at least one of the vise assemblies is a shuttle vise assembly, while the other vise assembly may be stationary. At least one of the vise assemblies is preferably mounted proximate to saw blade guide assemblies 50-53. The shuttle vise assembly, preferably vise assembly 34 mounted to feed table 21, preferably reciprocates as indicated by arrow 42 to align workpieces 61-66 in a cutting position during each cutting cycle. The shuttle vise assembly preferably operates generally as follows: after cutting of multiple workpieces is complete, shuttle vise assembly 34 releases the multiple workpieces and is displaced a predetermined distance in a first direction of arrow 42 away from saw blade guide assemblies 50-53, the displacement distance depending upon the desired cut length of workpieces 61-66; shuttle vise assembly 34 then clamps the workpieces and is displaced an equal distance in the opposite direction of arrow 42 to move multiple workpieces 61-66 into a cutting position. Means for reciprocating the shuttle vise assembly and means for clamping and releasing workpieces from the shuttle vise assembly are well known to the art.

Vise assembly 54 may be stationary and preferably clamps the workpieces when they are aligned in a cutting position and releases the workpieces after a cutting cycle has been completed. Suitable vise assemblies for clamping workpieces in generally horizontal and/or vertical directions are well known in the art. The operation of shuttle vise assemblies may be automated and controlled by means which are well known to the art. While vise assembly 34 has been described as a shuttle vise assembly, and vise assembly 54 has been described as a stationary vise assembly, it will be understood that the position of the shuttle and stationary vise assemblies may be reversed and, for different applications, both vise assemblies may be stationary, or both vise assemblies may reciprocate.

Figure 3:
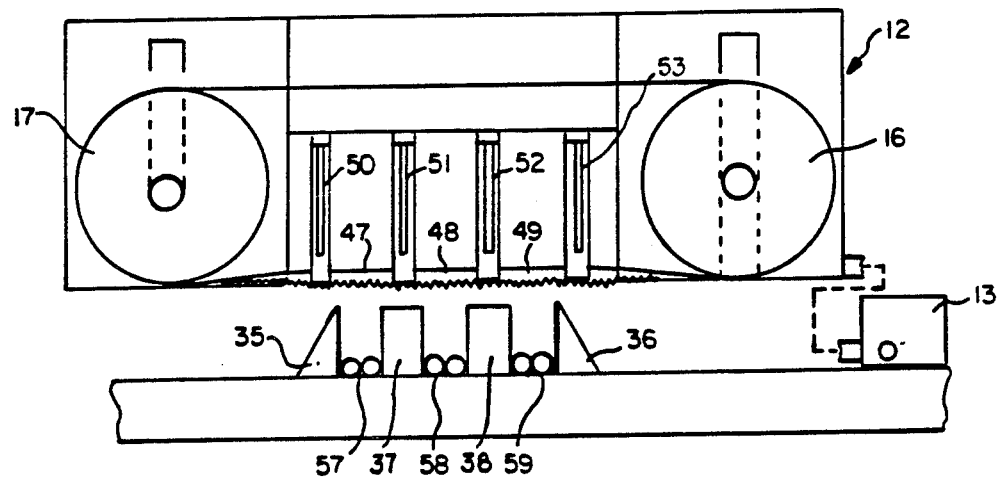
FIG. 3 shows a schematic side view of the band saw apparatus having multiple blade guide members and multiple workpiece retaining channels.

Each vise assembly preferably comprises two outer jaw members and at least one spacer member interposed between the jaw members to define at least two spaced workpiece retaining channels. Vise assemblies 34 and 54 illustrated in FIGS. 2 and 3 each comprise jaw members 35 and 36 and spacer members 37 and 38 positioned between the jaw members to define three spaced workpiece retaining channels 57, 58 and 59. It is important that the vise assemblies of the band saw apparatus of the present invention have at least three workpiece retaining and positioning means aligned in spaced apart relation to define at least two spaced workpiece retaining channels. Additional workpiece retaining channels may be provided by interposing additional workpiece retaining and positioning means between outer jaw members 35 and 36.

It is important that the number and arrangement of workpiece retaining channels corresponds to the number and arrangement of saw blade cutting stretches, so that the workpieces positioned in each retaining channel are generally centrally arranged with respect to each saw blade cutting stretch. The arrangement of multiple workpieces 61-66 in workpiece retaining channels 57, 58 and 59 with respect to saw blade cutting stretches 47, 48 and 49 is clearly shown in FIG. 3. At least one of the outer jaw members and at least one of the intermediate spacer members is preferably laterally adjustable to permit adjustment of the width of each workpiece retaining channel. The width of each workpiece retaining channel is preferably less than the length of the corresponding saw blade cutting stretch, and workpiece retaining channels are preferably centered with respect to the corresponding saw blade cutting stretch.

Figure 4:
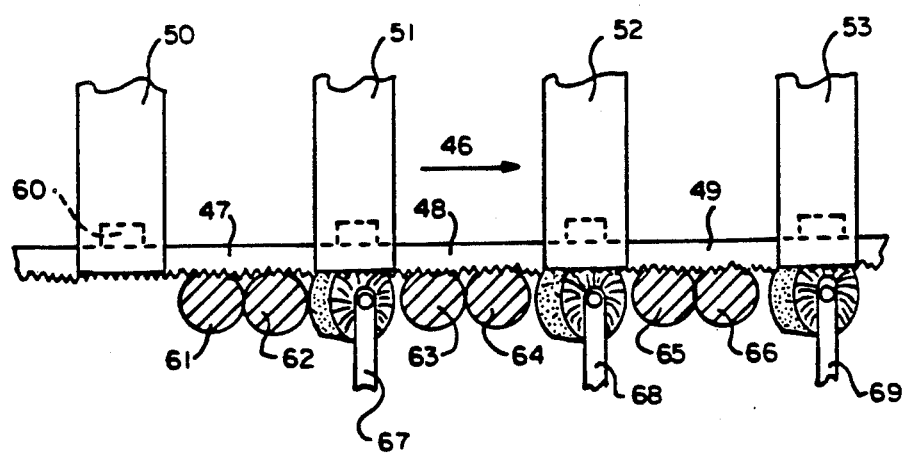
FIG. 4 is an enlarged, fragmentary, side view showing multiple blade guide members defining multiple cutting stretches of the saw blade.

According to a preferred embodiment of the band saw apparatus of the present invention, at least one of the blade guide assemblies is provided with a coolant supply and discharge means 60 shown schematically in FIG. 4, positioned for discharging coolant onto continuous loop saw blade 43. Suitable coolant supply and discharge means are known in the art, and are described, for example, in U.S. Pat. Nos. 3,848,493 and 4,558,614.

Coolant supply and discharge means may be provided in each of the saw blade guide assemblies, and are preferably provided at least to each saw blade guide assembly located upstream of a cutting stretch. For example, with reference to FIGS. 3 and 4, when saw blade 43 is rotated in the direction of arrow 46, saw blade guide assemblies 50, 51 and 52 are located upstream of saw blade cutting stretches 47, 48 and 49, respectively. Saw blade guide assemblies 50, 51 and 52 are preferably provided with coolant supply and discharge means to cool and lubricate continuous loop saw blade 43 upstream of each saw blade cutting stretch. Coolant also assists in removing workpiece chips from the gullets of the saw blade. Likewise, as shown in FIG. 4, brush means 67, 68 and 69 are preferably provided proximate to saw blade guide assemblies 51, 52 and 53 downstream from each of the saw blade cutting stretches to assist in removing workpiece chips from the surface of continuous loop saw blade 43. Brush means 67-69 are preferably mounted below continuous loop saw blade 43 to contact the saw blade at locations proximate the corresponding saw blade guide assemblies.

Figure 5:
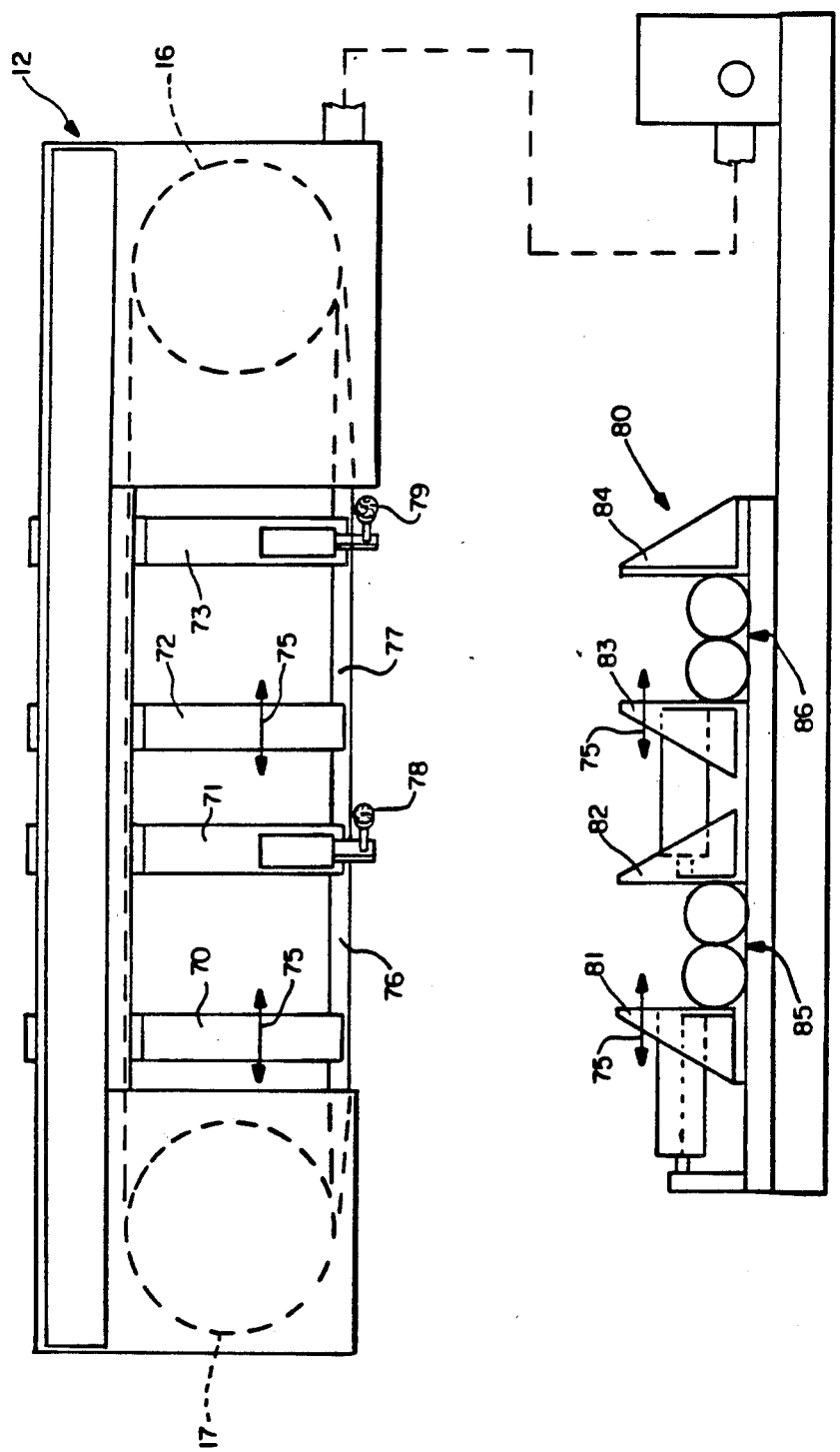
FIG. 5 shows a schematic side view of one preferred embodiment of the band saw apparatus of the present invention.

FIG. 5 illustrates a preferred embodiment of the band saw apparatus of the present invention wherein four saw blade guide assemblies are spaced apart from one another and orient the continuous loop saw blade to form two saw blade cutting stretches. As shown, saw blade guide assemblies 70, 71, 72 and 73 are carried by band saw arm 12 intermediate drive wheel 16 and idler wheel 17 and are aligned substantially along a cutting plane. As indicated by arrows 75, saw blade guide assemblies 70 and 72 are laterally adjustable, while blade guide assemblies 71 and 73 are fixed. Each pair of guide assemblies (70, 71) and (72, 73) thus defines a saw blade cutting stretch, shown as saw blade cutting stretches 76 and 77, respectively. The length of each saw blade cutting stretch is variable to accommodate different types and numbers of workpieces by lateral adjustment of saw blade guide assemblies 70 and 72. Brush means 78 and 79 are preferably provided proximate the fixed blade guide assemblies 71 and 73, respectively, downstream from each saw blade cutting stretch, for removal of workpiece chips from the surface of the continuous loop saw blade.

Vise assembly 80 for use with a band saw apparatus having multiple blade guide members defining two saw blade cutting stretches comprises a plurality of jaw members defining two spaced workpiece retaining channels 85 and 86. According to the preferred embodiment illustrated in FIG. 5, jaw members 81 and 82 define workpiece retaining channel 85 corresponding to saw blade cutting stretch 76, and jaw members 83 and 84 define workpiece retaining channel 86 corresponding to saw blade cutting stretch 77. Jaw means 81 and 83 are preferably laterally adjustable in the direction indicated by arrow 75, while jaw means 82 and 84 are preferably fixed. The arrangement of alternating adjustable and fixed jaw means preferably corresponds to the arrangement adjustable and fixed blade guide assemblies, as shown.

The band saw apparatus of the present invention provides multiple spaced saw blade cutting stretches and multiple spaced workpiece retaining channels. At least one workpiece is preferably positioned in each workpiece retaining channel and cut at each saw blade cutting stretch. Spaced alignment of multiple workpieces in this manner allows each cutting stretch to be relatively short to reduce saw blade stress and misalignment during cutting, permits cooling and lubrication of the saw blade between each saw blade cutting stretch, and permits removal of workpiece cutting chips from the gullets of the saw blade downstream from each saw blade cutting stretch. The lower blade temperature and chip removal allow the saw blade to be operated at a higher speed than is possible when cutting bundled workpieces. Thus, reduced cutting times can be achieved and the danger of chip welding is reduced.

Operation

The band saw apparatus of the present invention may be operated to cut multiple workpieces simultaneously according to the following method. The continuous loop band saw blade is rotated and oriented in a cutting position by at least three spaced blade guide assemblies to define at least two spaced saw blade cutting stretches. Multiple workpieces are aligned in a cutting position in spaced workpiece retaining channels aligned with and corresponding to the multiple saw blade cutting stretches. The workpieces are securely clamped in the cutting position by means of a vise assembly or the like, and the saw blade cutting stretches and workpieces are displaced with respect to one another to simultaneously contact each of the saw blade cutting stretches to the workpieces positioned in each of the corresponding workpiece retaining channels. In this fashion, multiple workpieces are cut simultaneously at spaced saw blade cutting stretches. If a pivotal arm band saw is utilized as described above, it will be understood that although the workpiece positioned closest to the pivotal mounting will be contacted by the saw blade first, all workpieces will be cut substantially simultaneously.

Using the apparatus and method of the present invention, greater cutting efficiency can be achieved when doing production cutting of workpieces. For example, the cycle time for cutting a single 2.0 inch diameter 304 stainless steel bar is about 40 seconds. Once the cut is complete, about 15 seconds are required to raise the saw arm, release vise 54, shuttle another length of bar up to the cutting stretch, and reclamp the bar with vise 54. Cutting thirty lengths of bar from the bar stock in an automated production run requires about 27.5 minutes.

The band saw apparatus of the present invention can reduce that time substantially. If three lengths of bar stock are clamped in channels 57, 58 and 59 and ten cuts are made, cutting three lengths of bar simultaneously, thirty pieces can be cut in about 9.16 minutes. This represents a time reduction of 66.7 percent. The reduction is achieved by being able to cut each bar at about the maximum cutting rate for 304 stainless, about 5 square inches per minute, since the blade can be cleaned and cooled between each bar. Additionally, the time between cuts is the same but may be divided now between three bars. Thus, the 15 seconds required between cuts to shuttle the bar stock for cutting of the next piece remains unchanged, but three pieces are cut instead of one.

If three bars were clamped between a single pair of vise jaws, the time between cuts would be divided by three, but the saw cutting rate would have to be reduced since there would be no significant cooling or cleaning between bars. Thus, the total cutting time for 30 pieces would be about 22.5 minutes, an 18 percent time reduction compared to making 30 cuts in a single workpiece.

The productivity of the band saw apparatus of the present invention having multiple cutting stretches is significantly greater than that of prior art band saw apparatus, since it cuts multiple workpieces simultaneously at substantially the maximum efficient cutting rate. The band saw apparatus of the present invention is functionally similar to two or more conventional band saws operated side by side.

It should be noted that some reduction of blade speed is required when cutting three pieces instead of one, but the reduction is much less than the increase in the number of pieces cut.

Finally, each rotation of endless band saw blade 43 on wheels 16 and 17 is accompanied by bending of the blade over both wheels and twisting of the blade by 90 degrees as it enters the first guide assembly and by 90 degrees in the opposite direction as it enters the second guide assembly. This bending and twisting slowly fatigues the blade. In the band saw of the present invention, the multiple cutting stretches results in multiple pieces being cut for each revolution of the band saw blade. Thus, more pieces can be cut before the blade becomes so fatigued as to fail. This is particularly important in production cutting since blade failure requires shut down of the saw with an attendant drop in efficiency and increase in cutting cost.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:
1. A band saw comprising:
a frame;
a pair of spaced, aligned wheels rotatably mounted to said frame;
a continuous loop band saw blade mounted on said aligned wheels and rotatable in a continuous loop thereby; and
at least three aligned blade guide assemblies mounted to said frame intermediate said wheels in spaced apart relation to define at least two cutting stretches each of said cutting stretches being between two adjacent blade guide assembles, each of said blade guide assemblies slidably engaging said saw blade during the entire cut to guide and orient a portion of said saw blade for cutting of at least one workpiece at each of said cutting stretches.

2. A band saw according to claim 1, additionally comprising at least three aligned workpiece retaining and positioning means mounted proximate and generally aligned with said blade guide members.

3. A band saw according to claim 2, comprising three aligned blade guide assemblies in spaced apart relation defining two cutting stretches, and three aligned workpiece retaining and positioning means defining two spaced workpiece retaining channels.

4. A band saw according to claim 3 wherein, said three aligned workpiece retaining and positioning means comprise a vise assembly having two jaw members and a spacer member interposed between said jaw members.

5. A band saw according to claim 4 wherein, at least one of said jaw members is laterally adjustable.

6. A band saw according to claim 4 wherein, said spacer member is laterally adjustable.

7. A band saw according to claim 1, additionally comprising brush means positioned to contact said saw blade downstream from each of said cutting stretches to remove workpiece chips from said saw blade.

8. A band saw according to claim 1, comprising four aligned blade guide assemblies in spaced apart relation to define three cutting stretches between adjacent blade guide assemblies.

9. A band saw according to claim 8, additionally comprising four aligned workpiece retaining and positioning means mounted proximate and generally aligned with said blade guide assemblies defining three spaced workpiece retaining channels.

10. A band saw according to claim 9 wherein, said four aligned workpiece retaining and positioning means comprise a vise assembly having two jaw members and two spacer members interposed between said jaw members.

11. A band saw according to claim 1 wherein, at least one of said blade guide assemblies has coolant supply and discharge means positioned for discharge of coolant onto said saw blade.

12. A band saw according to claim 11 wherein, each of said blade guide members has coolant supply and discharge means positioned for discharge of coolant onto said saw blade.

13. A band saw according to claim 12, additionally comprising brush means positioned to contact said saw blade downstream from each of said cutting stretches to remove workpiece chips from said saw blade.

14. A band saw according to claim 1, wherein at least one of said saw blade guide assemblies is laterally adjustable.

15. A band saw according to claim 1, comprising four aligned blade guide assemblies in spaced apart relation to define two saw blade cutting stretches and four aligned workpiece retaining and positioning means mounted proximate and generally aligned with said blade guide assemblies defining two spaced workpiece retaining channels corresponding to said two saw blade cutting stretches.

16. A band saw according to claim 15 wherein, said four aligned blade guide assemblies include two laterally adjustable blade guide assemblies alternating with two fixed blade guide assemblies, and said four aligned workpiece retaining and positioning means include two laterally adjustable workpiece retaining and positioning means alternating with two fixed workpiece retaining and positioning means.

17. A band saw according to claim 16 additionally comprising brush means positioned to contact said saw blade downstream from each of said cutting stretches to remove workpiece chips from said saw blade.

18. In a band saw of the type comprising a frame, a pair of spaced, aligned wheels rotatably mounted to said frame, a continuous loop band saw blade mounted on said aligned wheels and rotatable in a continuous loop thereby, and guide means mounted to said frame intermediate said wheels and formed for sliding engagement with said saw blade to guide and orient a portion of said saw blade for cutting at least one workpiece, the improvement comprising:

said guide means including at least three aligned blade guide assemblies in spaced apart relation to define at least two cutting stretches, each of said cutting stretches being between two adjacent blade guide assemblies, each of said blade guide assemblies engaging said saw blade during the entire cut to guide and orient a portion of said saw blade throughout cutting of at least one workpiece from positions on opposite sides of said workpiece at each of said cutting stretches.

19. In a band saw of the type comprising a frame, a pair of spaced, aligned wheels rotatably mounted to said frame, a continuous loop band saw blade mounted on said aligned wheels and rotatable in a continuous loop thereby, guide means mounted to said frame intermediate said wheels slidably engaging said saw blade to guide and orient a portion of said saw blade for cutting at least one workpiece, and workpiece retaining and positioning means mounted proximate and generally opposed to said guide means, the improvement comprising:

said guide means including three aligned blade guide assemblies in spaced apart relation to define at least two cutting stretches, each of said cutting stretches being between two adjacent blade guide assemblies, each of said blade guide assemblies engaging said saw blade during the entire cut to guide and orient a portion of said saw blade throughout cutting of at least one workpiece from positions on opposite sides of said workpiece at each of said cutting stretches; and said workpiece retaining and positioning means including at least three spaced, aligned workpiece positioning and retaining assemblies defining at least two spaced workpiece retaining channels aligned with said cutting stretches.

20. A method for cutting multiple workpieces simultaneously with a band saw apparatus having a continuous loop saw blade comprising:

aligning and clamping multiple workpieces in a vise assembly in side-by-side spaced apart relation;

rotating said continuous loop saw blade and guiding said saw blade in a cutting orientation along at least two side-by-side spaced apart cutting stretches by means of at least three aligned blade guide assemblies, each of said cutting stretches being between two adjacent blade guide assemblies; and displacing said saw blade and said workpieces with respect to one another to contact each of said saw blade cutting stretches with said workpieces to effect cutting thereof while continuing said guiding step by each of said blade guide assemblies throughout cutting.

21. A method according to claim 20 and the additional step of:
clamping said workpieces in at least two workpiece retaining channels aligned with and corresponding to said saw blade cutting stretches.

22. In a method for cutting multiple workpieces simultaneously with a band saw apparatus wherein multiple workpieces are aligned generally parallel to one another and are clamped by a vise assembly, spaced blade guide assemblies slidingly engage a continuous loop saw blade to orient said saw blade in a cutting position throughout cutting along a saw blade cutting stretch intermediate the blade guide assemblies, and the continuous loop saw blade and the workpieces are displaced with relation to one another to cut multiple workpieces at the saw blade cutting stretch, the improvement comprising:
orienting and guiding said saw blade in a cutting position throughout cutting along at least two spaced saw blade cutting stretches by means of at least three spaced blade guide assemblies engaging the blade during the entire cut, each of said cutting stretches being intermediate two blade guide assemblies.

23. In a method for cutting multiple workpieces simultaneously with a band saw apparatus according to claim 22, the improvement further comprising aligning said multiple workpieces in at least two workpiece retaining channels aligned with and corresponding to said saw blade cutting stretches.

* * * * *